United States Patent [19]
Cotter

[11] Patent Number: 5,900,956
[45] Date of Patent: May 4, 1999

[54] OPTICALLY ENCODED SIGNALS

[75] Inventor: David Cotter, Woodbridge, United Kingdom

[73] Assignee: British Telecommunications public limited company, London, United Kingdom

[21] Appl. No.: 08/530,268

[22] PCT Filed: Mar. 1, 1994

[86] PCT No.: PCT/GB94/00397

§ 371 Date: Nov. 15, 1995

§ 102(e) Date: Nov. 15, 1995

[87] PCT Pub. No.: WO94/21088

PCT Pub. Date: Sep. 15, 1994

[30] Foreign Application Priority Data

Mar. 2, 1993 [EP] European Pat. Off. ............. 93301568
Sep. 10, 1993 [GB] United Kingdom ................... 9318799

[51] Int. Cl.⁶ .................................................. H04B 10/00
[52] U.S. Cl. ........................... 359/139; 359/117; 359/140; 359/165
[58] Field of Search .................................... 359/117, 139, 359/140, 165

[56] References Cited

U.S. PATENT DOCUMENTS

| | | | |
|---|---|---|---|
| H6126 | 1/1997 | Kersey | 359/140 |
| 5,060,305 | 10/1991 | Prucnal et al. | 359/140 |
| 5,119,222 | 6/1992 | Hara et al. | 359/165 |
| 5,239,399 | 8/1993 | Evans et al. | 359/139 |
| 5,581,388 | 12/1996 | Gambini et al. | 359/140 |
| 5,619,360 | 4/1997 | Marshall et al. | 359/149 |

*Primary Examiner*—Leslie Pascal
*Attorney, Agent, or Firm*—Nixon & Vanderhye P.C.

[57] ABSTRACT

In a method of recognizing an optically encoded binary word, the word is chosen from a subset of binary words for which $W \oplus T=0$ if $W=T$, $W \oplus T=1$ if $W \neq T$ is true, where T is the target word, W is the word to be compared and $\oplus$ is the operation formula (I). The word is recognized by carrying out in the optical domain a bit-wise Boolean AND operation. The operation is carried out on the word to be recognized and the complement of the target word. The AND operation may be carried out by introducing the word to be recognized and the target word into a nonlinear crystal and detecting the second harmonic output from the crystal. The complement of the target word may be generated by a fixed word-forming network. The method may be applied to recognizing the address of a packet on an optical network.

33 Claims, 7 Drawing Sheets

OPTICALLY ENCODED SIGNALS

BACKGROUND TO THE INVENTION

The present invention relates to a method and apparatus for processing optically encoded signals, and in particular to the recognition of an optically encoded binary word.

The need to compare a digitally encoded word with a target word arises in a variety of different contexts within the overall field of optical communication and signal processing systems. One important application for such techniques is in the recognition of addresses in the header of a frame carried on an optical communications network. To enable use of such a network at very high bit is rates, e.g. 100 Gbit/s, it is important that the recognition can be carried out at ultrafast speed, e.g. 400 ps for a 40-bit word. To this end, a number of different approaches have previously been proposed. These include ultrashort pulse spectral phase encoding, optical correlation using spread spectrum and time division encoding techniques, and all-optical logic techniques using, for example, a soliton-dragging gate or a non-linear optical loop mirror. In the case of techniques of this latter sort, using non-linear fibre devices, it has been possible to process ultrafast optical signals. However, such devices suffer a significant disadvantage, in that they have long latency times, that is a long delay between input and output signals.

One approach to codeword recognition is disclosed in PCT/CH91/00122. Whilst recognising the need to provide speed and sensitivity, this prior system relies upon a hybrid electrical/optical system in which the word to be recognized W is applied in the optical domain to a gate switched by an electrical control sequence corresponding to the target word T. The output from the gate is summed incoherently in a photodetector. In practice, the speed of recognition achievable with such a system is severely limited.

SUMMARY OF THE INVENTION

According to the present invention, in a first aspect there is provided a method of recognising an optically encoded binary word W characterised in that the word is recognised by carrying out in the optical domain a bit-wise Boolean AND operation on the word W to be recognised, or a word derived therefrom and the target word T or a word derived therefrom.

Preferably the word encoded is chosen from the subset of binary words for which $W \oplus T = 0$
if $W = T$
$W \oplus = 1$
if $W \neq T$ is true, where T is the target word and W is the word to be compared.

In the notation adopted in the present specification, $W \oplus T$ is the operation $$\sum_{i=1}^{n} (w_i \cdot \bar{t}_i)$$

where $w_i$ and $t_i$ are the ith bits of the respective binary words and, as is customary in Boolean algebra, sums and products represent the OR and AND operations, respectively, and $\bar{t}_i$ denotes the logical complement of $t_i$.

The present inventor has realised that with an appropriate choice of codewords it is possible to carry out recognition entirely in the optical domain, using an optical AND operation.

The preferred embodiment restricts the encoding words to a sub-set of all the possible n-bit binary words and then carries out word recognition using a method based entirely on AND operations at the bit level. As discussed in further detail below, the AND operation, as represented by the simple scalar product of two optical fields, is a fundamental capability of many non-linear optical devices. Accordingly, it can be implemented far more straightforwardly than other logical operations, such as the exclusive-OR operation previously used for optical code word recognition. This approach will therefore allow the processing of optical code words at ultrafast speeds far beyond the capability of electronic logic circuitry, but with the possibility of modest energy requirements, high stability and low latency in the signal processing devices, together with small physical volume and potential for integration. Bit rates in excess of 10 Gbit/s and potentially as high as 100 Gbit/s and beyond can be achieved.

The use of ultrafast non-linear optical AND gates has previously been proposed as a means of demultiplexing very high speed optical data. In such a scheme, if A is a very high speed data stream and B is a lower frequency optical clock signal, then the output A.B is a lower frequency sample of A at the clock rate. When the output A.B is detected and converted to an electrical signal the highest clock rate that can be used is limited by the response time of the photodetector and associated electronic circuitry. Recently F Forghieri et al [7] have suggested applying such a demultiplexing technique to the problem of recognising and interpreting header information in very high speed optical packets. However, although they use an optical AND operation for demultiplexing, word recognition is carried out in the electrical domain, rather than the optical domain. Accordingly the bit rate which can be handled is limited by the response time of the photodetector and associated electronics. For example, in a 100 Gbit/s system, if the full header field contains 40 bits and the response time of the photodetector is 100 ps, then the time required to read out the header using the method of Forghieri et al is 40×100 ps=4 ns.

In the approach adopted in the present invention, by contrast with the prior art, the process of word recognition is carried out in the optical domain with only the final discriminatory output being produced in the electrical domain. Accordingly the bit rate is not limited by the response time of the photodetector and electronics. This means that when, for example, the system is used to read the header in a very high speed optical packet, this can be done at the full bit rate of the packet. In the example given above, the time required to process a 40 bit header by our method would be 40×10 ps=400 ps, a ten-fold increase in speed by contrast with the system described by Forghieri et al.

In the context of an ultra fast optical network, this process of recognition may be carried out at a switching node in which an incoming packet encoded in RTZ format, e.g. as solitons, is routed according to whether the packet address field H is equal to a local address A. A single optical pulse P which is in precise synchronism with the incoming packet may be generated and passed through a passive split-delay-recombine network which converts it to a pulse train representing $\bar{A}$ (the binary logical complement of the local address A).

The incoming packet header H and the pulse train $\bar{A}$ are, in this example, incident simultaneously at an ultra fast optical AND gate. The output of the gate is zero only if H equals A. If H is not equal to A, then at least one optical pulse is obtained at the output of the optical AND gate. This output is detected (i.e. converted to the electrical domain)

and may be used to control the routing switch. Only one optical AND gate is needed. No electrical summation or multi-level discrimination is needed. Since the output of the gate is immediately converted to the electrical domain, the gate need not be wavelength preserving, neither need it have high optical efficiency nor need it be cascadable. Any ultrafast non linear optical device yielding an output proportional to the scalar product of two input fields may be used.

The non-linear optical device used to carry out the AND operation may, for example, be a SHG (second harmonic generator) crystal. Alternatively, other non-linear optical processes may be used, such as optical sum-frequency or difference-freauency mixing, harmonic generation, polarisation rotation using the optical Kerr effect, cross-phase modulation, degenerate four-wave mixing, or optical phase conjugation. All these non-linear optical phenomena produce an output proportional to the scalar product of two input optical signals. A variety of non-linear optical media may be used, such as crystals, semiconductors, organic materials or glasses. It may be particularly advantageous to use a non-linear optical medium in the form of an optical waveguide.

The present invention is not limited to processing signals representing a time-series, such as the header of a packet on an optical network. It may also be used for pattern or image recognition, in which case the different bits of the binary word will be distributed in space rather than in time. The different bits $W_1, W_2 \ldots W_i$ of the word then correspond to binary pixels, and the image is recognised by carrying out AND operations on the pixels in the optical domain with the complement of the binary target image.

Preferably the code word W is provided with a datum pulse having a fixed, bit-asynchronous time relationship to the rest of the word, and the datum pulse is used in generating a pulse sequence T' dependent on the target word T.

Preferably the word T' is generated by applying the word W including the datum pulse to a splitter/delay network, the different arms of the network having different respective delays determined depending upon the target word T.

This aspect of the present invention overcomes the need to generate locally a pulse synchronised to the incoming code word. Instead, each code word is provided with an additional pulse which has a fixed time relationship to the code word pulse train but is bit-asynchronous with it. For example, the datum pulse may occur 1.5 bit periods before the start of the header of a packet. This datum pulse is then used in generating a word related to the target word T for ANDing with the incoming code word. This may be done, for example, using a network which creates a signal including the logical complement $\bar{T}$ of the target word.

According to a second aspect of the present invention, there is provided an address reader for detecting and recognising the address associated with a packet carried on an optical communication system, characterised in that the said means are arranged to recognise the address by a method in accordance with the first aspect of the present invention.

Although the present invention is by no means limited in applicability to reading addresses in an optical communication system, it does offer particular advantages in this field. Potentially it offers the capability of operating at ultragigabit rates making possible higher speed packet switching in advanced broadband optical networks.

Embodiments of the present invention will now be described, by way of example only, and the theoretical background to the invention discussed with reference to the accompanying drawings, in which:

DESCRIPTION OF EXAMPLES

Figure 2A:
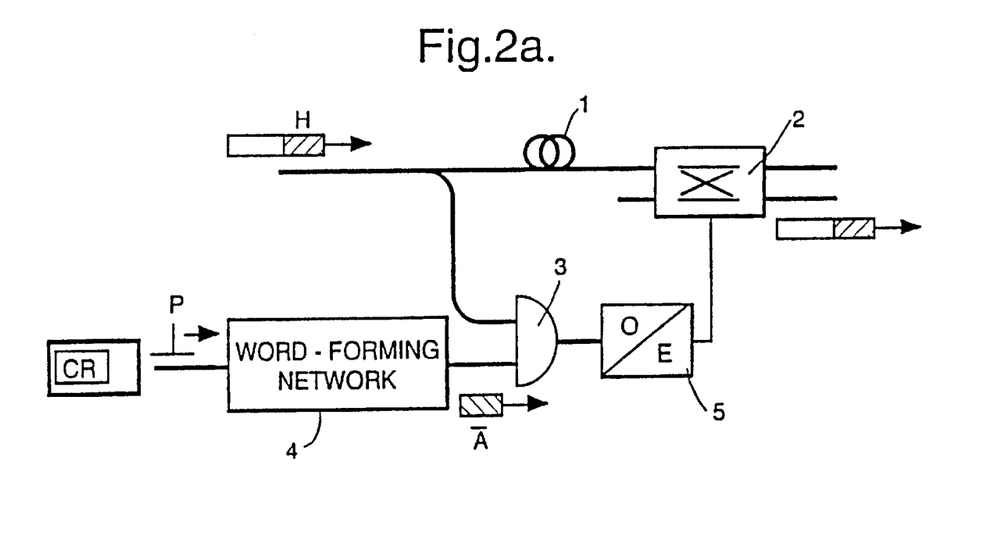
FIGS. 2a and 2b are schematics of an optical communication system embodying the invention, and a word-forming network.
Figure 2B:
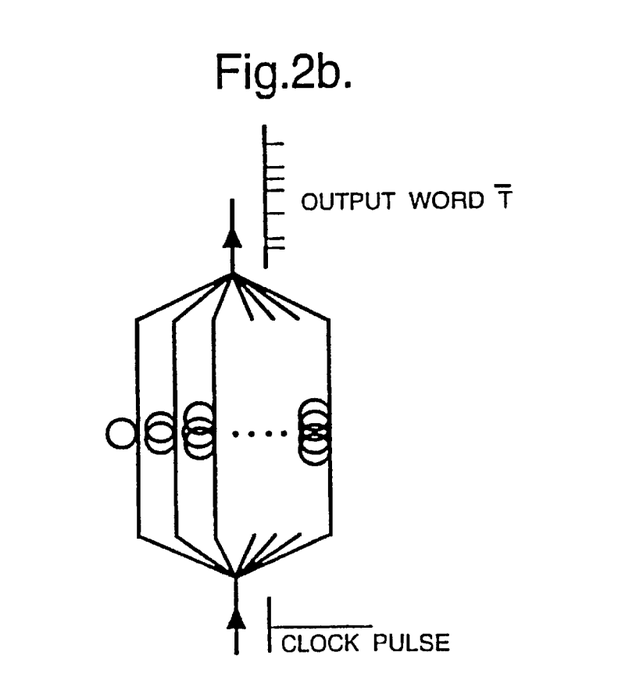
Figure 3:
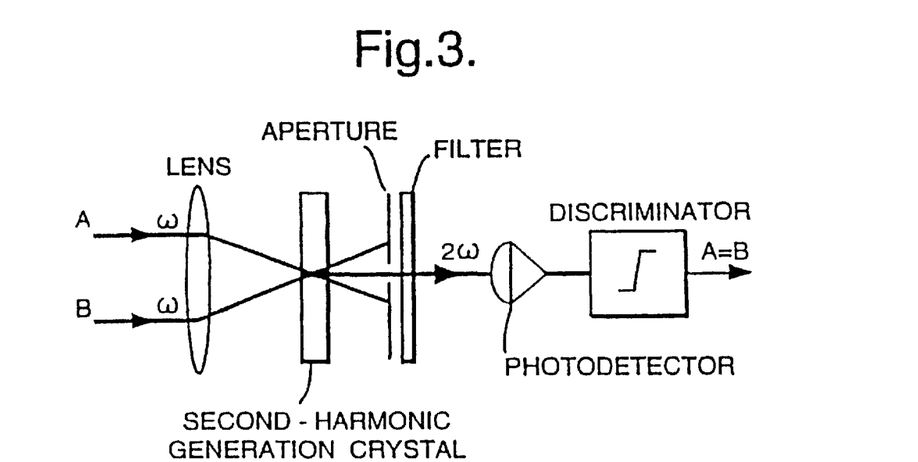
FIG. 3 shows an optical AND gate.
Figure 4A:
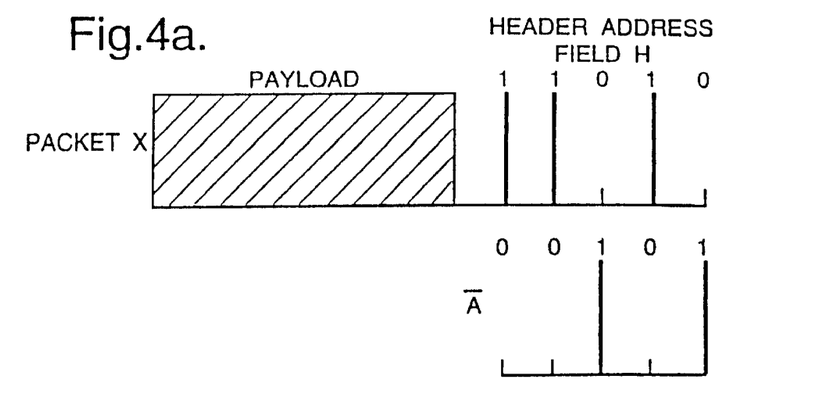
FIGS. 4a and 4b illustrate the use of the system of FIG. 2 in recognising a header address field.
Figure 4B:
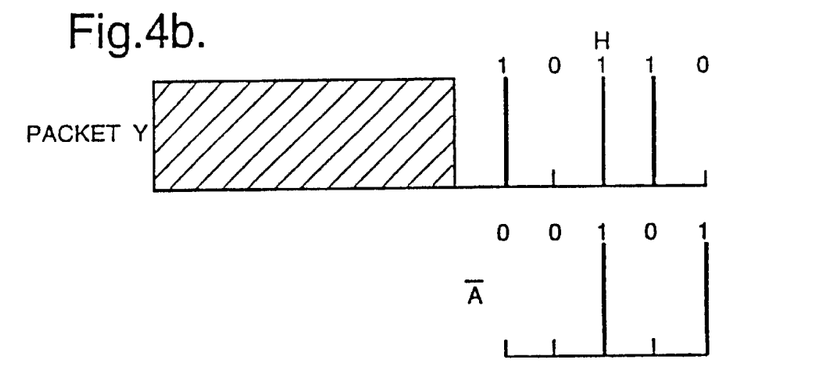

In the embodiment shown in FIG. 2a, a broadband optical network carries packets of optically encoded data. At an electro-optic routing switch 2 the packets of data are directed to one or other of two branches of the network. Upstream of the switch 2, part of the signal carried on the network is diverted and gated so that the header of a packet of traffic data is fed to a pulse-coincidence detection gate 3. There the binary word W forming the address is compared with the complement of a target word T supplied to the gate from a word-forming network 3. The input to the word-forming network 3 is provided by a clock-recovery unit CR. The output of the gate 3 is converted to an electrical signal by a detector 5 and the resulting signal used to control the switch 2. A buffer 1 delays the arrival of the packet at the routing switch 2 until the routing switch has been set correctly.

The gate 3 carries out a bit-wise Boolean AND operation on the pulse train. The gate may consist of a suitable non-linear crystal, oriented in such a way that the two optical pulse trains give rise to efficient generation of second harmonic radiation only if two input pulses A and B are incident simultaneously at the crystal and intersect in the crystal at different angles. This is a technique known as non-collinear SHG (second harmonic generation). The crystal orientation satisfies the phase matching condition that ensures no significant SHG occurs with a single pulse on its own.

The second harmonic output from the crystal is detected and used to control the electro-optic switch 2 to give the correct routing for the packet. The routing switch could be, for example, a planar waveguide lithium niobate 2×2 switch with sub-nanosecond switching time, such as is manufactured by E-Tek Dynamics and supplied by Optilas Limited of Milton Keynes. The photodetector converts the optical AND signal into an electrical signal. An aperture and filter prevent the optical signals input to the crystal from reaching the photodetector, but allow the SHG signal to pass.

Optionally, an electronic discriminator may be placed after the photodetector to set a decision threshold level so that the output is one when A and B inputs are present simultaneously.

Alternative arrangements may be used for the optical AND gate. In particular, Type II phase matching second harmonic generation may be used. In this arrangement the two input beams are collinear but their electrical field vectors are polarised in orthogonal directions. The crystal is then oriented so that SHG is obtained only when input pulses are present simultaneously in each of two polarisation directions. A spectral filter blocks the input beams before they reach the photodetector.

In the circuit shown in FIG. 2a, a clock recovery unit generates an optical clock pulse in exact synchronism with the incoming optical packets (i.e. 1 pulse per packet). This clock recovery may be done using an optical phase locked loop of the type described by S P Dijaili et al [8]. The clock pulse is then passed through a passive optical network that converts the single pulse into a pulse train that represents a binary word. This word-forming network may comprise a multi-wave splitter and recombiner between which are a number of separate optical paths. The lengths of these paths are all slightly different and chosen so that the output pulse train represents the logical complement of the target word T. The word-forming network is thus "hard-wired" to produce the required word T. This type of passive network may conveniently be fabricated using photolithographic processing together with planar silica waveguide technology (as described for example by C J Beaumont et al [9]). The optical delay line shown in the Figure delays the incoming packet until there is has been sufficient time for the electro-optic switch to be set correctly.

As an alternative to the use of a single hard-wired word-forming network, for some fields of use it may be beneficial to use a word-forming network which can be flexibly configured, for example under network management control. This is of particular use where it is required to change the address of a node or to reconfigure a communications network dynamically, for example in response to a change in traffic demands, or in response to a network fault condition. In this case, the word-forming network consists of a number of optical paths which can be selected by means of electro-optic or opto-mechanical switches some or all of the optical paths may contain such a switch. By means of electrical signals applied to these switches, so as to block some paths and unblock or reconfigure others, it is possible to reconfigure the word-forming network in a variety of ways so as in effect to change at will the output word $\overline{T}$.

Figure 10:
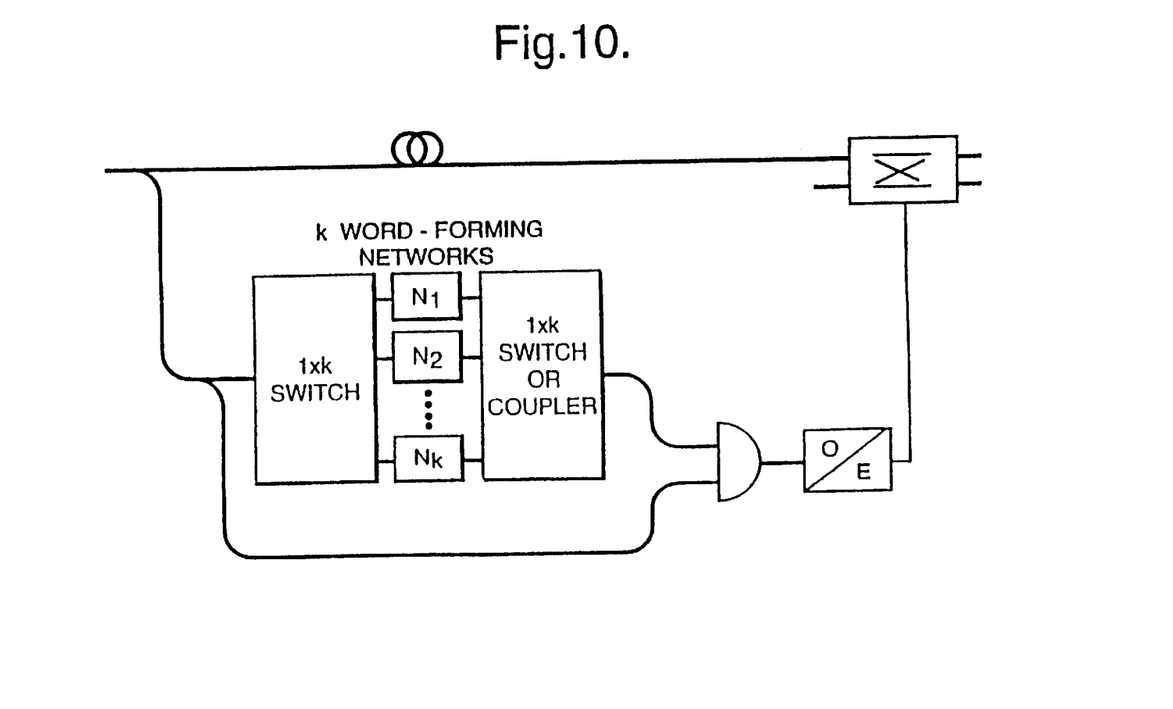
FIG. 10 is a schematic of an alternative embodiment using a configurable word-forming network.

FIG. 10 shows a first example of such an approach. In this example, a number k of fixed word-forming networks are provided, and a given one of the networks is chosen using 1×k switches. Each of the different networks corresponds to a different target word.

Figure 11A:
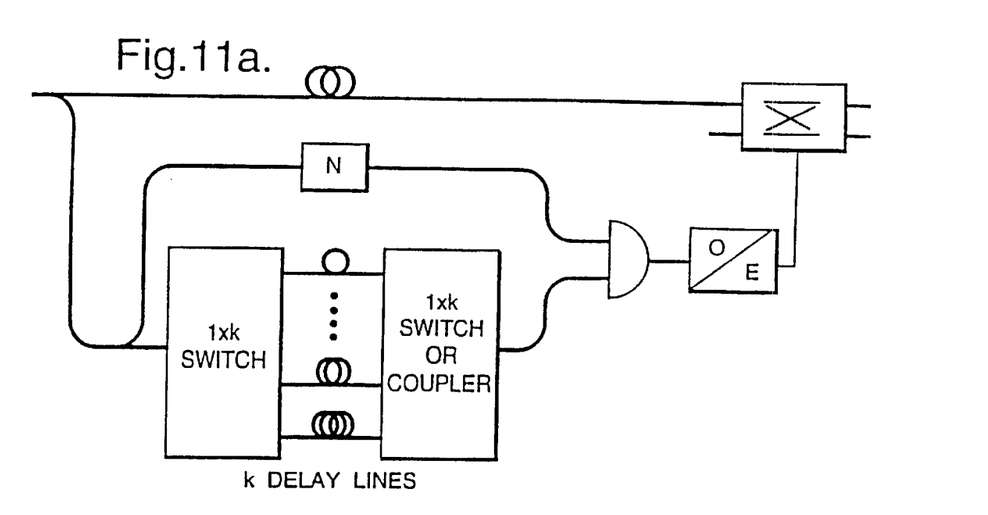
FIG. 11(a) is a schematic of a further embodiment configurable to select different header fields and FIG. 11(b) shows the different header fields.
Figure 11B:
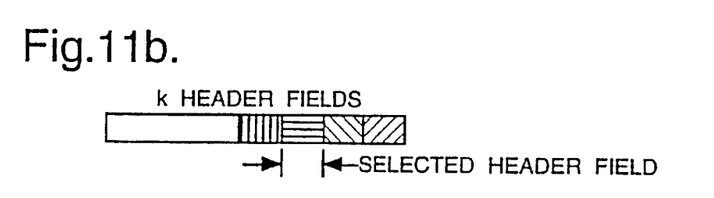

FIG. 11(a) shows an alternative arrangement where it is possible to perform the word-recognition process on different fields of the header (FIG. 11(b)). As before, the word-forming network N (which may be fixed or reconficurable) is used to recognise whether the input word matches a target word $\overline{T}$, which in this case is the same length as the sub-divided fields of the header. By configuring the switches and so setting the length of the delay provided by the selected one of k delay lines, it is possible to select which part of the header (i.e. which field) is to be recognized.

Figure 12:
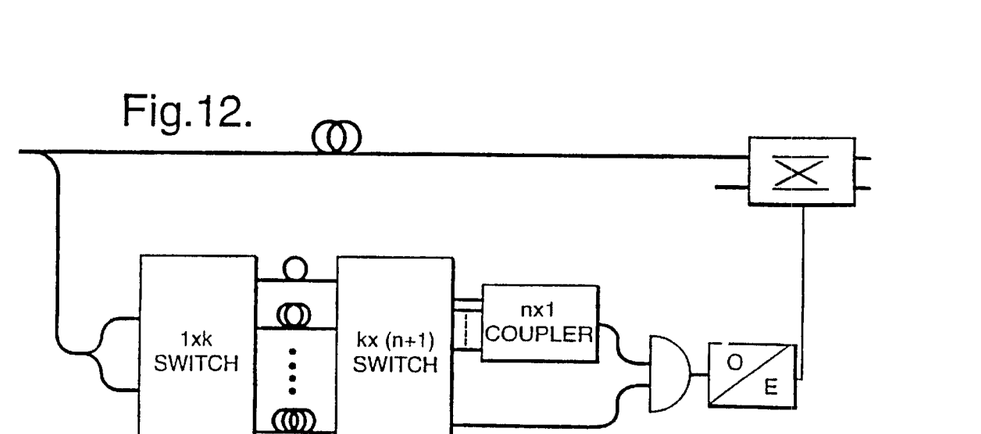
FIG. 12 is a schematic of a further alternative embodiment.

FIG. 12 shows a further alternative embodiment is offering even greater flexibility. In this circuit both the target word and also the header field if required can be freely selected by using the switches to configure fully both the target word and the second input to the optical AND gate.

It will be appreciated that a number of further alternative arrangements are possible using appropriate permutations of electro-optic or opto-mechanical switches and different delay lines. In the examples of FIGS. 10 to 12, the word-forming network acts on a datum pulse carried with the word to be recognised, in the manner described in further detail below with respect to FIG. 5. Configurable word forming networks may also be used similarly with independently generated synchronised pulses in circuit configurations as described, for example, with reference to FIG. 2A.

Figure 5:
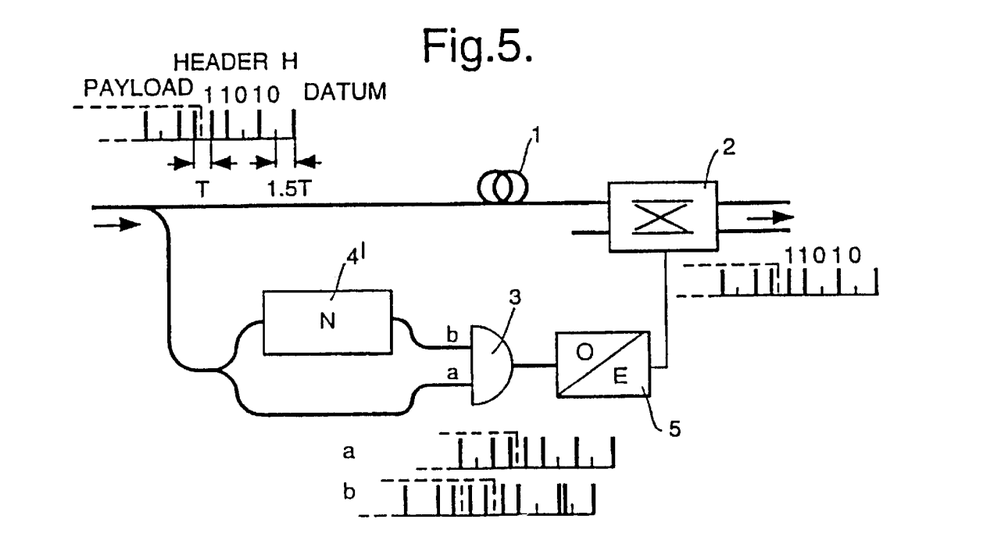
FIG. 5 is a schematic of an alternative embodiment of the present invention.

FIG. 5 shows an alternative embodiment which overcomes the need for a locally generated synchronising pulse P in generating the target word. As before, the incoming packet is split, with one branch going via a buffer 1 to the routing switch 2 and the other branch being used to provide an input to the AND gate 3. However, as shown in the Figure, the manner in which the other input to the AND gate is generated is modified.

The incoming packet now includes an additional pulse, the "datum pulse" which precedes the header and has a fixed time relationship to the header pulse train. The datum pulse is bit-asynchronous in relation to the header, i.e. it is not separated from the header by an integral number of bit periods. In the presently described example, the datum pulse occurs 1.5 bit periods before the start of the header.

The incoming packet is split a second time, with one branch being applied to a passive network 4' and the other branch going directly to the input of the optical AND gate 3. The network 4', which is shown in further detail in FIG. 6, has n arms, where n is the total number of zeros in A. The network reproduces and recombines the entire packet including the datum pulse n times, each version being delayed by a time $T_j$, which is the time difference between the datum pulse and the jth zero in the local address A. As will be apparent from the example described below, this has the effect of producing a combined output word T' which has a pulse derived from one of the datum pulses in each bit position of the header where there is a zero in the corresponding bit position of the local address A. There is no pulse in the bit positions where there is a 1 in the local address A. The datum pulses are therefore used in effect to generate the binary complement $\overline{A}$ of the local address.

Figure 6:
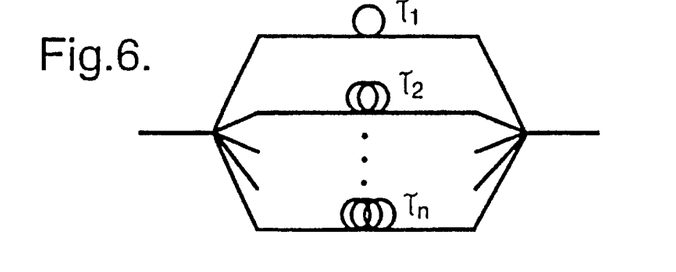
FIG. 6 is a more detailed view of the passive network of FIG. 5.

The output from the network 4' is applied to the AND gate 3 and as before the output from the AND gate 3 is non-zero if H is not equal to A. This technique therefore allows self-routing to occur without the need for bit-level synchronisation at the network node. The passive network 4' can be fabricated using compact planar silica-on-silicon technology, providing a component which can readily be exchanged, for example, to allow a change of the local address.

Figure 7:
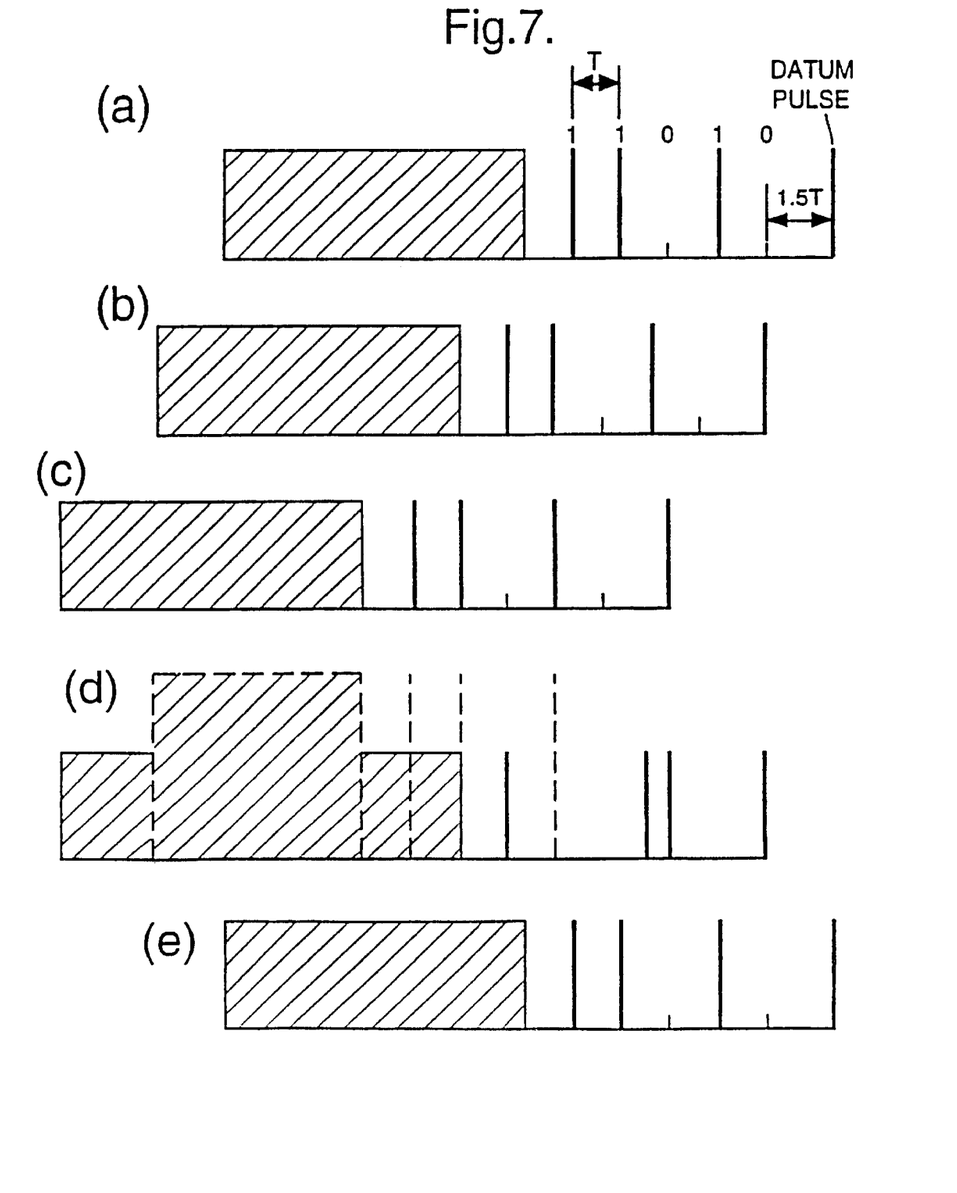
FIGS. 7a to 7e are timing diagrams illustrating the operation of the network of FIG. 6.

A simple example of this technique is shown in FIG. 7, where again it is assumed that the local address A and packet header H are 5-bit words. For illustration the local address is again taken to be A=01011, so that n=2 and $\overline{A}$=10100. In FIG. 7(a), an incoming packet has the header address field H=01011, so that H=A. The bit period is T and the datum pulse occurs 1.5T before the first bit of the header field H. This packet is input to a passive network N with delays $T_1$=1.5T and $T_2$=3.5T to produce the two delayed packets shown in FIGS. 7(b) and (c) which are combined to produce the optical signal shown in FIG. 7(d). This signal is applied to one input of the optical AND gate, whilst the other input to the gate is the undelayed packet shown in FIG. 7(e). In this case, is since H=A, there are no pulses incident simultaneously at the two inputs to the AND gate, so there is no optical output from the gate (i.e. H⊕A=0). If however H≠A, and provided H and A are taken from the required word set, then an optical output signal is obtained from the gate, and this would be used to set the routing switch accordingly.

To ensure that no significant optical output is obtained from the AND gate when H=A, it is necessary that the width of each optical pulse in the packet is substantially shorter than the bit period T. The exact amount by which the pulses must be shorter than T depends on factors such as the efficiency of the AND gate, the photo-detector sensitivity, the temporal shape of the pulses, and the optical and electrical noise levels. In practice this should be determined by trial and error; however the following approximate criteria give a guide. For rectangular optical pulses of width t, we require t<T/2. For pulses with a temporal shape that is $sech^2$ in intensity (such as soliton pulses), we require t<T/4 approximately, where t is the full width at half-maximum intensity of the pulse.

In the present example, the optical wavelength is 1.55 microns, the optical line rate is 100 Gbit/s (i.e. the bit period T=10 ps) and the individual optical pulses are 2 ps wide.

It will be noticed that the AND gate can have a non-zero output only if the datum pulses that are delayed by the passive network N (and so occur in the signal FIG. 5(d) applied to one input of the AND gate) coincide with pulses in the header address field of the non-delayed signal FIG. 7(e) which is applied to the other input of the AND gate. This results from the arrangement of the datum pulse so that it is out of synchronism with the rest of the packet, and the use of delays $T_j$ in the passive network N that are non-integer multiples of the bit period T. It will also be noticed that some of the pulses in FIGS. 7(b) and (c) overlap, so that when they are is combined at the output of the passive network N they will coherently interfere; in other words, at certain times the resulting intensity in the combined signal FIG. 7(d) can have any value between zero and the sum of the input intensities, depending on the relative optical phase of the pulses being combined. This is represented in FIG. 7(d) by the dotted pulses. Pulses in the payload sequence (not shown in detail in the figures) may also interfere in the same way. However these interference effects are unimportant because the dashed pulses never occur at the input of the AND gate simultaneously with pulses in the undelayed header address field FIG. 7(e).

In the circuit of FIG. 5, the various optical connections are conveniently made in monomode optical fibre. The two splitters (one at the input to the circuit, and one just before the "passive network N") are standard fused fibre couplers. The splitter ratios are not particularly critical. The first splitter could perhaps have a ratio of 10:90% so that most of the energy in the incoming packet is transferred through the routing switch whilst a smaller fraction is passed to the header recognition part of the circuit. The second splitter (the one just before the passive network N) could have a splitting ratio chosen so that the intensities of individual pulses at the two inputs to the optical AND gate are roughly equal. (For the optical AND gate based on second-harmonic generation, described below, it is not in fact necessary for the inputs to be of the same intensity, since the output intensity is proportional to the product of the two input intensities.) Since there are two arms in the device N, it would be appropriate to have a ratio of say 33:66% for the second splitter, so that twice as much power went to the input of the device N as went along the lower path direct to the a input of the AND gate. The buffer may conveniently be a length of monomode optical fibre—sufficiently long so that the packet is delayed such that the state of the routing switch has been set correctly before the packet arrives at the switch. In this case "sufficient" might be ~2 ns delay, which would be provided by about 40 cm of fibre. The passive device N may conveniently be fabricated using photolithographic processing together with planar silica waveguide technology (as is described for example by CJ Beaumont et al in BT Technology Journal Vol. 9, No 4, Pages 30–35, October 1991). The O/E convertor may conveniently be a photomultiplier tube followed by a TTL monostable circuit with an output pulse width just long enough to hold the routing switch in the "activated" state following an electrical output pulse from the photomultiplier tube to allow the complete packet to pass through (for example, a 500 bit packet at 100 Gbit/s would need the switch to be held in the correct state for at least 5 ns). The photomultiplier tube, in this case, should have a rise time of ~2 ns and be sensitive to the second-harmonic wavelength (1.55 μm/2=0.77 μm)—a suitable device is the photomultiplier type 9817B manufactured by Thorn EMI.

The nonlinear optical device used to carry out the optical AND operation may, for example, be a second-harmonic generation crystal, although many other nonlinear optical processes may be used. Similarly, the other components described above are instanced by way of example only. As will be apparent, many alternative device types may be substituted in implementing the invention.

Figure 8:
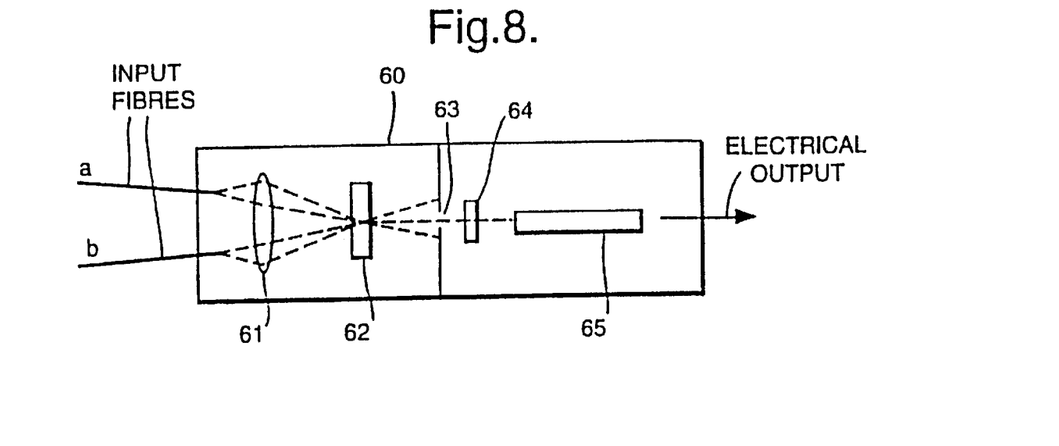
FIG. 8 is a further example of an optical AND gate.

One example of an appropriate optical AND gate and detector is shown in FIG. 8. The system is contained in a lightproof housing 60. The lens 61 brings the output from the two input fibres a, b to the same focal spot inside on SHG crystal 62. A fraction of the input light is converted to the second harmonic wavelength. The crystal is oriented in such a way that a second-harmonic pulse is produced only if a pulse from each of the two fibres is incident simultaneously at the crystal; if a pulse from one of the input fibres reaches the crystal, without simultaneously a pulse from the other fibre, there is no second-harmonic pulse generated. This is a well-known technique known as 'non-collinear phase-matching'. The purpose of the aperture 63 and filter 64 is to prevent light from the input fibres reaching the photomultiplier, whilst allowing the second-harmonic beam to pass. The filter should have a spectral characteristic that attenuates the input wavelength (1.55 μm) strongly and attenuates the second-harmonic (0.77 μm) to a much lesser degree. A suitable filter would be the glass type KG5 manufactured by Schott Glaswerke. The output from the filter passes to a photomultiplier 65.

Figure 9:
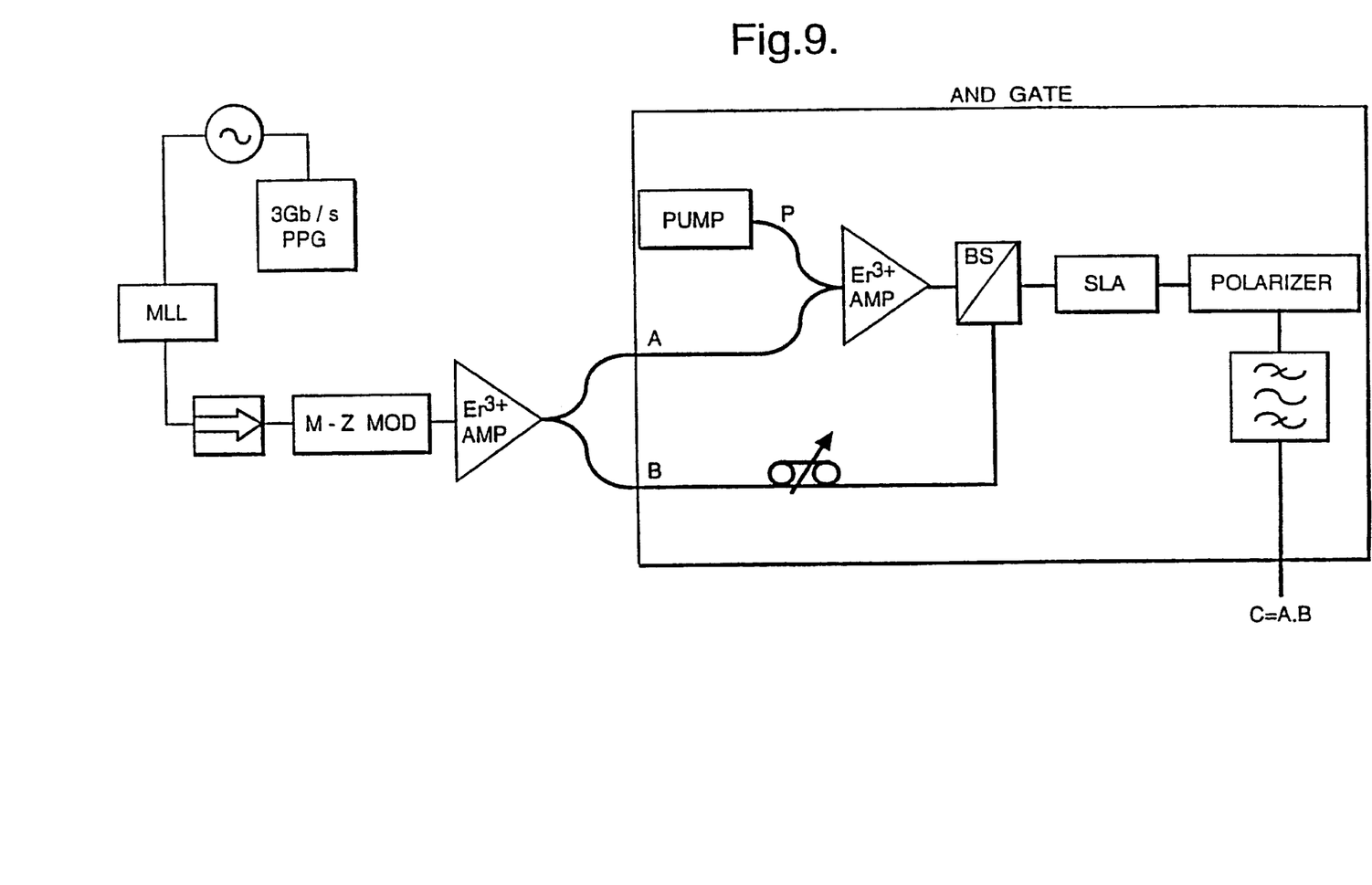
FIG. 9 is a further alternative embodiment of the AND gate.

FIG. 9 shows an alternative AND gate using four-wave mixing in a semiconductor laser amplifier (SLA). This configuration is to be preferred for uses, such as header recognition, which require low latency (i.e. a short response time to incoming signals).

In the gate shown in FIG. 9, two signals (A and B) at wavelength $\lambda_s$ are injected into the SLA in orthogonal polarisation states. A CW pump beam P at $\lambda_p$ copolarised with signal A is also injected into the SLA. Four-wave mixing occurs between signal A and P to produce primary side-bands at $\lambda_s-(\lambda_p-\lambda_s)$ and $\lambda_p+(\lambda_p-\lambda_s)$. A gain modulation (and hence refractive index modulation) is impressed on the SLA at the beat frequency between $\lambda_p$ and $\lambda_s$. The signal B sees this modulation and produces side-bands at $\lambda_s+(\lambda_p-\lambda_s)$ and $\lambda_s-(\lambda_p-\lambda_s)$ in the orthogonal polarisation state to signals A and P. Mixing does not occur when the pump beam P and signal beam are injected into the SLA orthogonally polarised, so no wavelength conversion of B occurs unless A is also present. The signal at $\lambda_s-(\lambda_p-\lambda_s)$ in the B polarisation plane is isolated through the use of an optical polariser and bandpass filter. This signal represents an AND between signal A and signal B, as the P beam is on continuously.

In the circuit shown in the figure, signal A at 1553.15 nm is combined with a pump P at 155.08 nm from a tunable external cavity laser 91 in a 3 dB coupler. The is combined signal A+P is amplified in an erbium-doped fibre amplifier 92 and passes through a beam splitter/combiner 93 and is combined in an orthogonal polarisation state with A+P. The polarisations of A, B and P are optimised for maximum transmission using the fibre pigtailed polarisation beam splitter/combiner. The three signals are then coupled into a 500 μm long strained-layer 8-well MQW buried heterostructure SLA with a gain peak at −1.56 μm when biased at 340 mA. The output from the SLA passes through a fibre polariser adjusted to extinguish the signals in the A+P polarisation axis. This is followed by a 0.6 nm fibre-grating band pass filter centred at 1551.20 nm to isolate the AND signal. This signal is further amplified before being detected on a high-speed photodetector (bandwidth −18 GHz). As before, the output from the photodetector may be used, for example, to control a routing switch. For demonstration purposes the output may be viewed on a oscilloscope.

Although for experimental purposes the circuit of FIG. 9 shows the inputs A and B generated using a pulse-pattern generator based on a Mach-Zehnder modulator, when applied to the codeword recognition systems of the present invention, the AND gate may take, for example, the word to be recognised W as input A, and the output of the word-forming network, corresponding to the complement of the target word $\overline{T}$, as the input B.

The method by which the code word, in the present example the address, is recognised, and the theoretical background to encoding algorithms used are described in further detail below.

While described above in relation to recognition of an address for a packet on a broadband optical network, it will be appreciated that this is by way of example only and that the method of the present invention is applicable in a wide variety of fields.

An essential operation in information processing is to recognise binary words (such as, for example, the header address sequences in a packet-switched telecommunications network). The problem of recognising an n-bit word $W=w_1 w_2 \ldots w_n$ is to determine whether the given word is identical to a specified target word $T=t_1 t_2 \ldots t_n$ (where $w_i$ and $t_i$ are binary digits). Symbolically, the task is to determine whether $$\prod_{i=1}^{n} (\overline{w_i \oplus t_i})$$

is equal to 0 or 1 where the value 1 signifies recognition (W=T) and value 0 signifies non- recognition (W≠T). (As is customary in Boolean algebra, sums and products represent the logical OR and AND operations, respectively, $\oplus$ denotes exclusive-OR, and $\overline{t_i}$ denotes the logical complement of $t_i$.) For some applications (e.g. ultrafast optical signal processing) it is advantageous to express the logical task differently so that word recognition is signified by a zero output; this can make it easier in practice to set the discrimination threshold [1]. In that case a suitable algorithm is $$\sum_{i=1}^{n} (w_i \oplus t_i) = 0 \text{ or } 1$$

where 0 signifies W=T and 1 signifies W≠T. Whichever algorithm is used, the task of word recognition in the general case (valid for all words) requires exclusive-OR operations (or their logical equivalents) at the bit level. The implementation of an exclusive-OR gate with ultrafast nonlinear optics has been demonstrated using nonlinear fibre devices such as the Sagnac interferometer [2–4] and soliton-dragging gate [5]. These devices are capable of processing ultrafast optical signals, but typically require several hundreds of metres of optical fibre for each logic gate.

The present invention uses an alternative approach to word recognition using an algorithm based on AND operations at the bit level. Unlike other logic operations, the AND operation, as represented by the simple scalar product of two optical fields, is fundamental to all ultrafast nonlinear optical phenomena [6]. The algorithm therefore opens up many new device possibilities having desirable properties such as low latency (short delay time between input and output signals), passive long-term stability, small physical volume and potential for integration.

We propose the following algorithm for recognising binary words:

$$W \oplus T = 0$$

if W=T $$W \oplus T = 1 \quad (1)$$

if W≠T using the notation defined above. As applied to any n-bit word, the algorithm (1) is flawed, as a simple example (for n=3) readily shows. Taking as the target T any 3-bit word, the required result $W \oplus T=0$ is obtained when W=T (e.g. with T=011, $T \oplus T=0\cdot 1+1\cdot 0+1\cdot 0=0$). Also, taking W to be a different 3-bit word in (1) may correctly indicate non-recognition (e.g. with T=011 and W=110, $W \oplus T=1\cdot 1+1\cdot 0+0\cdot 0=1$, as required). However some words will wrongly indicate recognition (e.g. with T=011 and W=010, $W \oplus T=0\cdot 1+1\cdot 0+0\cdot 0=0$). Therefore to apply the algorithm we must restrict the range of n-bit words (and targets) to a subset of the full $2^n$ possibilities, such that the relation (1) is valid for any word and target selected from the subset. It is not difficult to verify that for 3-bit words, the set 001, 010, and 100 (or alternatively, 011, 101 and 110) will allow valid use of (1).

We now consider the question of how large a set of n-bit words can be constructed that allows valid use of (1). We state as a theorem that, for n even, the maximum allowed set comprises $n!/[(n/2)!]^2$ words consisting of n/2 ones and n/2 zeros in all permutations. For n odd, there are two equal-sized and mutually exclusive maximum sets each comprising $n!/\{[(n+1)/2]![(n-1)/2]!\}$ words; one is set contains words consisting of (n+1)/2 ones and (n−1)/2 zeros in all permutations, whilst the other set is obtained from the first by interchanging zeros and ones.

It is straightforward to verify the theorem directly for small values of n. We now prove the theorem for arbitrarily large n. The first of three steps in the proof is to determine, for any chosen n-bit target T, which n-bit words W have the property $W \oplus T=0$. The words that have this property are: i) the target T itself; ii) all possible words with zeros in the same positions as the zeros in T, the remaining bits being either ones or zeros (i.e. $w_i=0$ if $t_i=0$, and $w_i=0$ or 1 if $t_i=1$). Therefore all words W that have this property must contain fewer ones than T, unless W=T. It follows, therefore, that if $S_q$ denotes the set of n-bit words that consist exclusively of all possible permutations of q ones and n−q zeros, then all words and targets in $S_q$ must have the desired property (1). As a simple illustration of this, Table 1 lists all 4-bit words having 2 ones (the set $S_2$ for n=4). Suppose we take T=0101 as the target. It is then easy to verify that W⊕T=1 for all words in Table 1, except when W=T so that W⊕T=0·1+1·0+ 0·1+1·0=0.

The second step is to show that if any other n-bit word were added to the set $S_q$, the property (1) would be rendered invalid. Let $W_p$ be an n-bit word containing p ones (p<q) which is added to $S_q$. We can choose from the original set $S_q$ a word W that has p ones in the positions corresponding to the ones in $W_p$, and q−p ones in any other positions. It then follows that $W_p$⊕W=0 even though $W_p$≠W, so that the condition (1) is made invalid. Similarly, if $W_p$ is defined as before excent that p>q, we may choose from the original set $S_q$ a word W having n−p zeros in the positions corresponding to the zeros in $W_p$, and p−q zeros in any other positions. It follows in this case that W⊕$W_p$=0 even though $W_p$≠W, so that again (1) is made invalid. The second step of the proof is thus is complete. To illustrate this, the words 0001 and 0111 could not be added to $S_2$ listed in Table 1 without invalidating the property (1).

The last step is to realise that, if n is even, the largest set $S_q$ of n-bit words each having q ones occurs when q=n/2, and it contains $n!/[(n/2)!]^2$ words. If n is odd, there are two equal largest sets $S_q$ each containing $n!/\{[(n+1)/2]![((n-1)/2]!\}$ words; one set has q=(n−1)/2, the other has q=(n+1)/2. This completes the proof.

Figure 1:
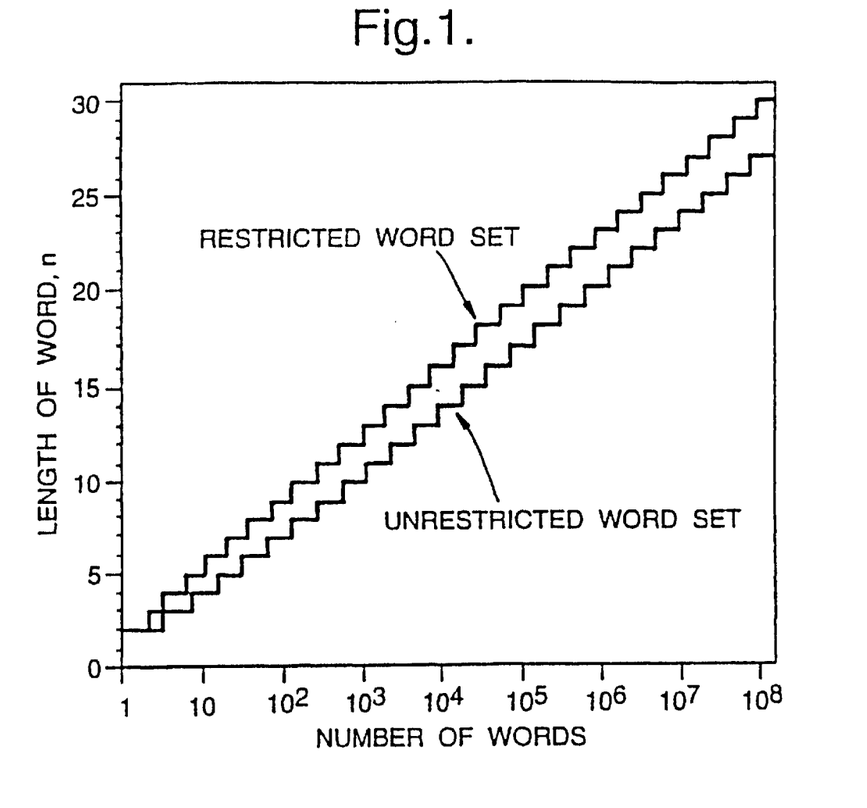
FIG. 1 is a diagram illustrating the number of words in the restricted word set used in the present invention.

To summarise, we have described an algorithm for the recognition of binary words. The algorithm is based on the logical AND operation at the bit level. The AND operation is fundamental in ultrafast nonlinear optical phenomena, as represented by the simple scalar product of two optical fields. The penalty for using this algorithm is the restricted range of n-bit words that can be used. A remaining question, therefore, is how serious a restriction is this in practice? FIG. 1 shows the word length n that is needed, depending on the total number of words required, when using the restricted word set ($S_{n/2}$ for n even or $S_{(n+1)/2}$ for n odd) or unrestricted coding ($2^n$−1). It can be seen that in the restricted case typically only 2 or 3 additional bits are needed for the construction of as many as 100 million unique words. For example, one million words can be constructed with 20 bits using unrestricted coding, whereas 23 bits are needed to construct a restricted word set of the same size that allows valid use of the algorithm (1). For some applications, such as packet header recognition in future ultrafast photonic networks, the few additional bits required would be an acceptable penalty to pay for a significant overall reduction in complexity of hardware at the network nodes.

TABLE 1

Word set $S_2$ for n = 4

| i | $W_i$ |
|---|---|
| 1 | 0011 |
| 2 | 0101 |
| 3 | 0110 |
| 4 | 1001 |
| 5 | 1010 |
| 6 | 1100 |

I claim:

1. A method for recognizing an optically encoded binary word comprising the steps of:

a. selecting the encoded binary word from a subset of binary words for which:
W⊕T=0
if W=T
W⊕T=1
if W≠T
is true where W is the encoded binary word, and T is a target word to be compared to W, and ⊕ is:

$$\sum_{i=1}^{n}(w_i \cdot \overline{t_i})$$

where $w_i$ and $t_i$ are $i$th bits of the binary words W and T, respectively, and b. the encoded binary word W is recognized in the optical domain by a bit-wise Boolean AND operation on the word W and the complement of the target word T.

2. A method according to claim 1, in which the word W is an address carried in a header of a packet transmitted on an optical network, the method further comprising controlling a routing switch for the packet in accordance with the result of the optical AND operation.

3. A method according to claim 1, in which the AND operation is carried out by introducing a first optical signal encoded with the word to be recognised W into a non-linear optical medium, introducing a second optical signal encoded with the complement of the target word T into the non-linear optical medium, and detecting the output of the non-linear optical medium.

4. A method according to claim 3, in which the optical output signal of the non-linear medium is discriminated from the first and second optical signals by virtue of its frequency.

5. A method according to claim 4, in which the first and second optical signals are at a frequency ω, and the optical output signal is at the second harmonic frequency 2ω.

6. A method according to claim 3, in which the optical output signal is distinguished from the first and second optical signals by virtue of its direction of propagation.

7. A method according to claim 3, in which the optical output signal is distinguished from the first and second optical signals by virtue of its polarisation state.

8. A method according to claim 3, in which the output optical signal is distinguished from the first and second optical signals by virtue of its phase.

9. A method according to claim 3, in which the non-linear optical medium is a crystal.

10. A method according to claim 3, including introducing an optical signal into a word-forming network arranged to generate an output corresponding to the complement of the target word.

11. A method according to claim 10, in which the word-forming network includes optical switching means and is configured by the optical switching means to recognise a selected one of a plurality of different target words.

12. A method according to claim 10, further comprising selecting one of a plurality of sub-fields of an incoming pulse sequence as the word W to be recognised.

13. A method according to claim 1, in which the bits $w_1$, $w_2$ ... $w_n$ correspond to binary pixels of an image to be recognised.

14. A method according to claim 1, in which the code word W is provided with a datum pulse having a fixed, bit-asynchronous time relationship with respect to the rest of the word, and the datum pulse is used in generating a pulse sequence T' dependent on the target word.

15. A method according to claim 14, in which the pulse sequence T' is generated by applying the code word W including the datum pulse to a splitter/delay network, the different arms of the network having delays determined depending on the target word T.

16. A method according to claim 15, in which each jth arm of the network delays the word W and corresponding datum pulse by a time $T_j$ which is the time difference between the datum pulse and the jth zero in the target word T.

17. A method according to claim 1, in which the non-linear optical medium is an optical waveguide.

18. An address reader (3,5) for detecting and recognising the address associated with a packet carried on an optical communication system, characterised in that the reader is arranged to recognise the address by a method in accordance with claim 1.

19. A device according to claim 18, in which the address reader includes a non-linear optical medium configured as an AND gate having inputs for first and second optical signals and having a detector connected to receive an output signal from the non-linear optical medium.

20. A device according to claim 19, in which the non-linear optical medium is an optical waveguide.

21. A device according to claim 19, in which the non-linear optical medium is a crystal.

22. A device according to claim 18 including a word-forming network (4) arranged to generate a target word or a word derived therefrom.

23. A device according to claim 22, in which the word-forming network (4) is arranged to generate an output corresponding to the complement of the target word.

24. A device according to claim 18, characterised by an optical pulse sequence generator (4') responsive to a datum pulse carried with the codeword W and having a fixed, bit-asynchronous time relationship to the rest of the codeword, said pulse sequence generator outputting a pulse sequence T' dependent on said target word T.

25. A method according to claim 1, in which the binary words are processed at a bit rate in excess of 10 Gbit/s.

26. A method of encoding a signal for transmission in the optical domain comprising the step of:

a. encoding the signal with a binary word W chosen from subset of binary words for which:
$W \oplus T = 0$
  if $W = T$
$W \oplus T = 1$
  if $W \neq T$ is true for any word W and a target word T in the subset and $\oplus$ is:

$$\sum_{i=1}^{n}(w_i \cdot \overline{t_i})$$

where $w_i$ and $t_i$ are ith bits of the words W and T, respectively.

27. An optical communication system comprising:

means for recognizing an optical codeword W by applying the optical codeword and an optical pulse sequence T' derived from a target word T, to an optical AND gate, where the codeword word W is from a subset of binary words for which:
$W \oplus T = 0$
  if $W = T$
$W \oplus T = 1$
  if $W \neq T$ is true for the word W and target word T, and where $\oplus$ is:

$$\sum_{i=1}^{n}(w_i \cdot \overline{t_i})$$

where $w_i$ and $t_i$ are $i$th bits of the words W and T, respectively, and means for generating the optical pulse sequence T' from a datum pulse carried with the codeword W and having a fixed, bit-asynchronous time relationship to the reset of the word.

28. An optical communication system comprising:

means for recognizing an optical codeword W by applying the optical codeword, and an optical pulse sequence T' derived from a target word T, to an optical AND gate, where the codeword word W is from a subset of binary words for which:
$W \oplus T = 0$
  if $W = T$
$W \oplus T = 1$
  if $W \neq T$ is true for the word W and the target word T, and where $\oplus$ is:

$$\sum_{i=1}^{n}(w_i \cdot \overline{t_i})$$

where $w_i$ and $t_i$ are $i$th bits of the words W and T, respectively and means for generating the optical pulse sequence T' from a datum pulse carried with the codeword W and having a fixed, bit-asynchronous time relationship to the rest of the word.

29. An optical communication system which recognizes optical packets including n-bit identifier words W, wherein the identifier words W are chosen from a subset of binary words for which:
$W \oplus T = 0$
  if $W = T$
$W \oplus T = 1$
  if $W \neq T$ is true for any identifier word W and a target word T in the subset and where $W \oplus$ is:

$$\sum_{i=1}^{n}(w_i \cdot \overline{t_i})$$

where $w_i$ and $t_i$ are $i$th bits of the words W and T, respectively and the system comprises a bit-wise Boolean AND gate that compares the identifier word W and a complement of the target word T.

30. A device for recognizing an optically encoded binary word comprising:

an optical AND gate including a first optical input for the optically encoded binary word W to be recognized and a second optical input for a target word T, where the word W is from a subset of binary words for which:
$W \oplus T = 0$
  if $W = T$
$W \oplus T = 1$
  if $W \neq T$ is true for the word W and for the target word T, and where ⊕ is:

$$\sum_{i=1}^{n}(w_i \cdot \bar{t_i})$$

where $w_i$ and $t_i$ are $i$th bits of the words W and T, respectively, and a detector responsive to the output of the AND gate.

31. A device according to claim 30, including a word-forming network arranged to generate a target word, or a word derived from the target word for inputting to the optical AND gate.

32. A device according to claim 31, in which the word-forming network includes optical switching means and is configured by the optical switching means to recognise a selected one of a plurality of different target words.

33. A device according to claim 31, including means for selecting one of a plurality of sub-fields of an incoming pulse sequence as the word W to be recognised.

* * * * *